(12) United States Patent
Zhang et al.

(10) Patent No.: US 9,671,645 B2
(45) Date of Patent: Jun. 6, 2017

(54) DIRECT-TYPE BACKLIGHT AND LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Chunbing Zhang, Beijing (CN); Bin Yan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 270 days.

(21) Appl. No.: 14/358,269

(22) PCT Filed: Jun. 13, 2013

(86) PCT No.: PCT/CN2013/077194
§ 371 (c)(1),
(2) Date: May 15, 2014

(87) PCT Pub. No.: WO2014/176815
PCT Pub. Date: Nov. 6, 2014

(65) Prior Publication Data
US 2015/0253626 A1 Sep. 10, 2015

(30) Foreign Application Priority Data
Apr. 28, 2013 (CN) .......................... 2013 1 0154433

(51) Int. Cl.
*G02F 1/1335* (2006.01)
*G02F 1/1368* (2006.01)
(Continued)

(52) U.S. Cl.
CPC .......... *G02F 1/133621* (2013.01); *F21V 5/02* (2013.01); *G02F 1/1368* (2013.01);
(Continued)

(58) Field of Classification Search
CPC .... G01N 21/43; G01N 21/253; G01N 21/553; G01N 15/1434; G01N 21/4133;
(Continued)

(56) References Cited

U.S. PATENT DOCUMENTS 4,849,866 A 7/1989 Mori
6,104,446 A 8/2000 Blankenbecler et al.
(Continued)

FOREIGN PATENT DOCUMENTS

CN 85204962 U 7/1987
CN 87104204 A 1/1988
(Continued)

OTHER PUBLICATIONS

International Search Report for International Application No. PCT/CN2013/077194 issued Jan. 7, 2014, 12pgs.
(Continued)

*Primary Examiner* — Huyen Ngo
(74) *Attorney, Agent, or Firm* — Ladas & Parry LLP (57) ABSTRACT

A direct-type backlight and a liquid crystal display device including the same are disclosed. The direct-type backlight comprises: a prism component (1) having a plurality of prism-unit structures (11); a plurality of rows of lights sources (2) located below the prism component (1), and a plurality of gratings (3) located between the prism component (1) and the plurality of rows of lights sources (2), each row of the lights sources (2) corresponds to one prism-unit structure (11), and each row of the lights sources (2) comprises a plurality of lights sources (21). Divergent lights emitted from each of the lights sources (21) are converted into one or two bundles of linear lights after passing through the corresponding grating (3), and each bundle of the linear lights is split into visible lights of seven colors after being refracted by the corresponding prism-unit structure (11).

17 Claims, 4 Drawing Sheets

(51) Int. Cl.
*F21V 5/02* (2006.01)
*G02F 1/1343* (2006.01)

(52) U.S. Cl.
CPC .. *G02F 1/133512* (2013.01); *G02F 1/133528* (2013.01); *G02F 1/133606* (2013.01); *G02F 1/134309* (2013.01); *G02F 2001/133607* (2013.01); *G02F 2203/34* (2013.01)

(58) Field of Classification Search
CPC ....... G02B 27/2214; G02B 5/045; F21V 5/02; G02F 1/133512; G02F 1/133606; G02F 1/134309; G02F 2001/133607; G03F 9/7026
USPC ................ 345/174; 362/97; 29/622; 349/42, 349/61–65
See application file for complete search history.

(56) References Cited

U.S. PATENT DOCUMENTS

| | | | |
|---|---|---|---|
| 2008/0089092 A1* | 4/2008 | Lee | G02B 6/0018 362/612 |
| 2009/0097229 A1 | 4/2009 | Wood et al. | |
| 2011/0090425 A1* | 4/2011 | Nakagome | G02F 1/133606 349/64 |
| 2014/0160383 A1* | 6/2014 | Shikii | G02B 5/045 349/15 |
| 2015/0193064 A1* | 7/2015 | Lu | G06F 3/044 345/174 |

FOREIGN PATENT DOCUMENTS

| | | |
|---|---|---|
| CN | 101625458 A | 1/2010 |
| CN | 101878437 A | 11/2010 |
| CN | 102129137 A | 7/2011 |
| CN | 103018953 A | 4/2013 |
| JP | 1164850 A | 3/1999 |

OTHER PUBLICATIONS

International Preliminary Report on Patentability Appln. No. PCT/CN2013/077194; Dated Nov. 3, 2015.
Chinese Patent Certificate Appln. No. 1840741; Dated Nov. 18, 2015.
First Office Action (Chinese language) issued by the State Intellectual Property Office ("SIPO") on Nov. 21, 2014 for International Application No. 201310154433.8, 6 pages.
English translation of first Office Action issued by SIPO for International Application No. 201310154433.8, 5 pages.
Second Chinese Appln. No. 201310154433.8; Dated Jun. 4, 2015.

* cited by examiner

DIRECT-TYPE BACKLIGHT AND LIQUID CRYSTAL DISPLAY DEVICE

CROSS REFERENCE TO RELATED APPLICATIONS

This application is based on International Application No. PCT/CN2013/077194 filed on Jun. 13, 2013, which claims priority to Chinese National Application No. 201310154433.8 filed on Apr. 28, 2013. The entire contents of each and every foregoing application are incorporated herein by reference.

FIELD

The present disclosure relates to a direct-type backlight and a liquid crystal display device.

BACKGROUND

At present, liquid crystal display devices for color display have been widely used in industrial and consumer products. Conventional liquid crystal display devices generally use a color filter substrate to achieve color display characteristics. Specifically, a conventional liquid crystal display device comprises: a color filter substrate and an array substrate which are cell-assembled, a liquid crystal layer provided between the color filter substrate and the array substrate, and a backlight provided at a side of the array substrate facing away from the color filter substrate. The color filter substrate comprises: a base substrate and a color filter layer provided on the base substrate. The color filter layer comprises a plurality of color pixels, and each of the color pixels corresponds to one color selected typically from three primary colors of red, green, and blue. As the backlight emits lights with the spectral range covering these three colors of red, green, and blue, one color pixel only allows passage of the lights of corresponding color and absorbs the lights of other two colors, therefore, color display of the liquid crystal display device is achieved.

In the above-mentioned conventional liquid crystal display device having a color filter substrate, due to the light filtering effect of the color filter layer, there is considerable light loss, which results in a relative low transmittance of the liquid crystal display device.

SUMMARY

The present disclosure provides a direct-type backlight and a liquid crystal display device for improving the transmittance of the liquid crystal display device.

According to an embodiment of the present disclosure, there is provided a direct-type backlight comprising a prism component having a plurality of prism-unit structures; a plurality of rows of light sources located below the prism component; and a plurality of gratings located between the prism component and the plurality of rows of light sources. Each row of the light sources corresponds to one prism-unit structure, and each row of the light sources comprises a plurality of light sources. Divergent light emitted from each of the light sources are converted into one or two bundles of linear lights after passing through the corresponding grating, and each bundle of the linear lights is split into visible lights of seven colors after being refracted by the corresponding prism-unit structure.

In an example, each of the prism-unit structures has a cross-sectional shape of a triangle or trapezoid. For the incident angle of each bundle of the linear light irradiating on a bottom surface of the corresponding prism-unit structure and the deflection angle of the emergent light with respect to the incident light after being refracted by the prism-unit structure, the following relationship is satisfied:

$$\beta = A - \alpha + \arcsin(\sqrt{n^2 - \sin^2 A} \sin \alpha - \sin A \cos \alpha)$$

where, $\beta$ is the deflection angle of the emergent light with respect to the incident light, $\alpha$ is the angle between the bottom surface and a lateral surface of the prism-unit structure, A is the incident angle of the light, and n is the refractive index of the prism.

In an example, each of the prism-unit structures has a cross-sectional shape of a semi-circle. For the incident angle of each bundle of the linear light irradiating on a bottom surface of the corresponding prism-unit structure and the deflection angle of the emergent light with respect to the incident light after being refracted by the prism-unit structure, the following relationship is satisfied:

$$\beta = 2A - 2\arcsin\left(\frac{\sin A}{n}\right)$$

where, $\beta$ is the deflection angle of the emergent light with respect to the incident light, A is the incident angle of the light, and n is the refractive index of the prism.

In an example, each of the gratings is a first plane-plate grating, and the first plane-plate grating has a first rectilinear grating slit, with the longitudinal direction of the grating-slit parallel to or perpendicular to a longitudinal direction of the prism component.

In an example, between each of the light sources and the corresponding prism-unit structure, there is provided one first plane-plate grating, so that divergent lights emitted from each of the light sources are converted into a bundle of linear lights after passing through the first grating slit of the corresponding one first plane-plate grating, and incident into the corresponding prism-unit structure.

In an example, between each of the light sources and the corresponding prism-unit structure, there are provided two first plane-plate gratings, with the light source being located between the two first plane-plate gratings, so that divergent light emitted from each of the light sources are converted into two bundles of linear light after passing through the first grating slits of the corresponding two first plane-plate gratings respectively, and incident into the corresponding prism-unit structure.

In an example, light-emergent surfaces of each of the prism-unit structures are symmetric about the perpendicular bisector line of the bottom surface of the prism-unit structure, and each of the light sources is correspondingly located between the two first plane-plate gratings arranged symmetrically in an inverted V-shape.

In an example, the two first plane-plate gratings arranged symmetrically in an inverted V-shape has an integrated structure.

In an example, between every two adjacent prism-unit structures, there is provided one baffle, for alleviating the interference of the emergent lights from the two adjacent prism-unit structures.

According to an embodiment of the present disclosure, there is provided a liquid crystal display device comprising: a liquid crystal display panel comprising a plurality of pixels, and a direct-type backlight as described above provided at a side of the liquid crystal display panel. The visible lights of seven colors formed by splitting each bundle of the linear light after being refracted by the corresponding prism-unit structure irradiate on a corresponding pixel of the liquid crystal display panel.

In an example, the liquid crystal display panel comprises an array substrate and a counter substrate which are cell-assembled, a liquid crystal layer provided between the array substrate and the counter substrate, a black matrix having a plurality of openings and provided on the side of the counter substrate facing away from the array substrate, with each opening of the black matrix corresponding to one pixel of the liquid crystal display panel, a first polarizer provided on the side of the black matrix facing away from the array substrate, and a second polarizer provided on the side of the array substrate facing away from the counter substrate. The direct-type backlight is provided at the side of the first polarizer facing away from the array substrate.

In an example, for the distance between the array substrate and the direct-type backlight, the following relationship is satisfied:

$$L=W*(\cos \gamma)/(\tan \beta_1 - \tan \beta_2)$$

where, L is the distance between the array substrate and the direct-type backlight, W is the width of each of the pixels on the array substrate, $\gamma$ is the angle between the incident light and a normal line perpendicular to the array substrate, $\beta_1$ is the deflection angle of the violet emergent light with a wavelength of 405 nm, $\beta_2$ is the deflection angle of the red emergent light with a wavelength of 766 nm.

In an example, each of the openings of the black matrix comprises seven sub-openings arranged at intervals for passage of the visible lights of corresponding individual color.

In the direct-type backlight according to the present disclosure, firstly divergent lights emitted from each of the light sources are converted into one or two bundles of linear light by the grating, and then each bundle of the linear lights is split into visible lights of seven colors after being refracted by the prism by using the light splitting function of the prism, and irradiates on the corresponding pixel of the liquid crystal display panel, and thus by control of the ON-OFF of each pixel, the full color range display of the liquid crystal display device can be achieved. Compared with the prior art, the embodiments of the present disclosure do not require a color filter layer, which reduces light loss, thereby improving the transmittance of the liquid crystal display device.

BRIEF DESCRIPTION OF THE DRAWINGS

In order to clearly illustrate the technical solutions in the present disclosure or the prior art, the drawings needed for the description of the technical solutions of the present disclosure or the prior art will be briefly described in the following; it is obvious that the described drawings are merely illustration of some specific embodiments of the technical solutions of the present disclosure. Based on these accompanying drawings, those skilled in the art can obtain other drawing(s), without any inventive work.

DETAILED DESCRIPTION

Hereinafter, the technical solutions in the embodiments of the present disclosure will be described in a clearly and fully understandable way, in connection with the accompanying drawings in the embodiments of the present disclosure. It is obvious that, the described embodiments are only a part but not all of the embodiments of the present disclosure. Based on the embodiments in the present disclosure, those ordinary skilled in the art can obtain all other embodiment(s), without any inventive work, which should be within the scope of the present disclosure.

Unless otherwise defined, technical jargon or scientific terms used herein should be interpreted in the usual sense as understood by those ordinary skilled in the relevant art of the present disclosure. The terms "first", "second", and the like, used in the specification and claims of this patent application of the disclosure, do not denote any order, quantity, or importance, but are used to distinguish among different integral parts. Likewise, the words "a", "an" and the like, herein do not denote a limitation of quantity, but denote the presence of at least one of the referenced item. The terms "connection" or "interconnection" or the like, are not limited to physical or mechanical connections, but may comprise electrical connection, whether direct or indirect. The terms "upper", "lower", "left", "right" and the like, are only used to indicate a relative positional relationship, which may be varied with a change of an absolute position of a described object.

The present disclosure provides a direct-type backlight, in which, by using light splitting function of a prism, white lights generated by a light source are converted into visible lights of seven colors, and thus by control of the ON-OFF of each pixel, the full color range display of the liquid crystal display device can be achieved, and because a color filter layer is not required, the light loss is reduced, thereby the transmittance of the liquid crystal display device is improved.

In order to make the technical solutions of the present disclosure better understood by the person skilled in the art, hereinafter the embodiments of the present disclosure will be described in detail with reference to the accompanying drawings.

Figure 1:
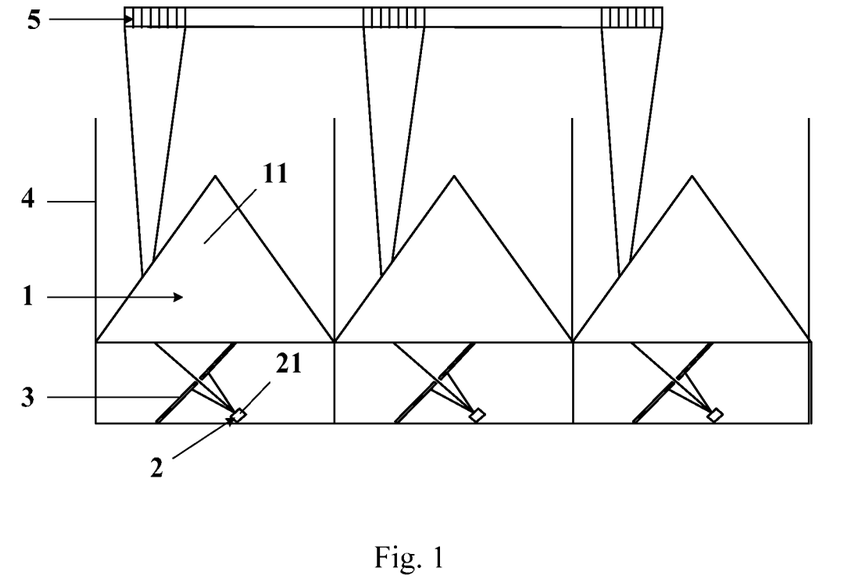
FIG. 1 is a schematic structural view of a direct-type backlight according to a first embodiment of the present disclosure.

As shown in FIG. 1, the direct-type backlight according to a first embodiment of the present disclosure comprises: a prism component 1 having a plurality of prism-unit structures 11; a plurality of rows of light sources 2 located below the prism component 1. Each row of the light sources 2 comprises a plurality of light sources 21, and each row of the light sources 2 corresponds to one prism-unit structure 11; and a plurality of gratings 3 located between the prism component 1 and the plurality of rows of light sources 2. Each of the gratings 3 corresponds to one prism-unit structure 11 and one row of the light sources 21.

For example, the individual prism-unit structures 11 of the prism component 1 may be identical in shape and size, and arranged uniformly. The cross-sectional shape of each of the prism-unit structures 11 is, for example, triangular, trapezoidal or semi-circular. Each grating 3 converts the divergent light emitted from the corresponding light source 21 into one or two bundles of linear light. Each bundle of the linear light is incident into the corresponding prism-unit structure 11 at a certain incident angle, and is split into visible lights of seven colors with wavelengths in the range of 405 nm~766 nm (that is, red, orange, yellow, green, blue, indigo and violet, in which, violet-light wavelength is 405 nm, red-light wavelength is 766 nm) after being refracted by the corresponding prism-unit structure 11. The visible light of seven colors formed from each bundle of the linear light after refraction irradiates on one corresponding pixel of the liquid crystal display panel 5. By control of the ON-OFF of each pixel, the full color range display of the liquid crystal display device can be achieved Compared with the prior art, the embodiments of the present disclosure do not require a color filter layer, which reduces light loss, thereby improving the transmittance of the liquid crystal display device.

In order to ensure that each bundle of the linear light can form visible light of seven colors after being refracted by the corresponding prism-unit structure 11, the incident angle of each bundle of the linear lights irradiating on the prism-unit structure 11 and the deflection angle of the emergent lights after being refracted by the corresponding prism-unit structure 11 with respect to the incident light have to satisfy a certain relationship with respect to the refractive index of the prism-unit structure 11 as well as the cross-sectional shape of respective prism-unit structure 11 in the prism component 1.

Figure 2:
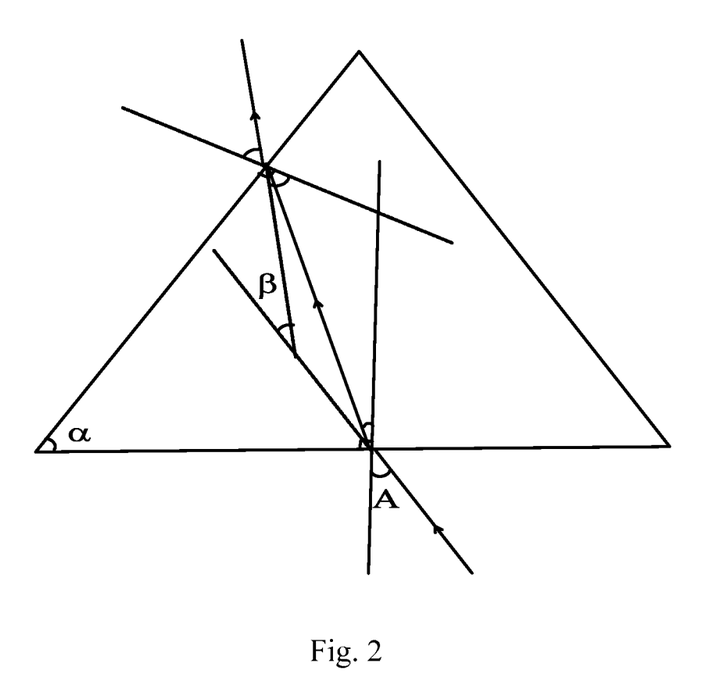
FIG. 2 is an optical path diagram in an embodiment of the present disclosure, in the case that each prism-unit structure has a cross-sectional shape of a triangle.

FIG. 2 is an optical path diagram in an embodiment of the present disclosure, in the case that each prism-unit structure 11 has a cross-sectional shape of a triangle. In the case that each of the prism-unit structures 11 has a cross-sectional shape of a triangle or trapezoid, the incident angle of each bundle of the linear lights irradiating on a bottom surface of the corresponding prism-unit structure 11 and the deflection angle of the emergent lights with respect to the incident lights after being refracted by the prism-unit structure 11 satisfy following relationships:

$$\beta = A - \alpha + \arcsin(\sqrt{n^2 - \sin^2 A} \sin \alpha - \sin A \cos \alpha) \quad (1)$$

where, $\beta$ is the deflection angle of the emergent lights with respect to the incident lights, $\alpha$ is the angle between the bottom surface and a lateral surface of the prism-unit structure 11, which is in a range of 20°~70°, A is the incident angle of the incident lights, and n is the refractive index of the prism.

That is, in the case that each of the prism-unit structures 11 has a cross-sectional shape of a triangle or trapezoid, for the incident angle A of each bundle of the linear lights incident into the prism component 1 and the deflection angle $\beta$ of the emergent lights with respect to the incident lights after being refracted by the corresponding prism-unit structure 11, the above relationship (1) has to be satisfied, so that each bundle of the linear lights can form visible lights of seven colors after being refracted by the corresponding prism-unit structure 11.

Figure 3:
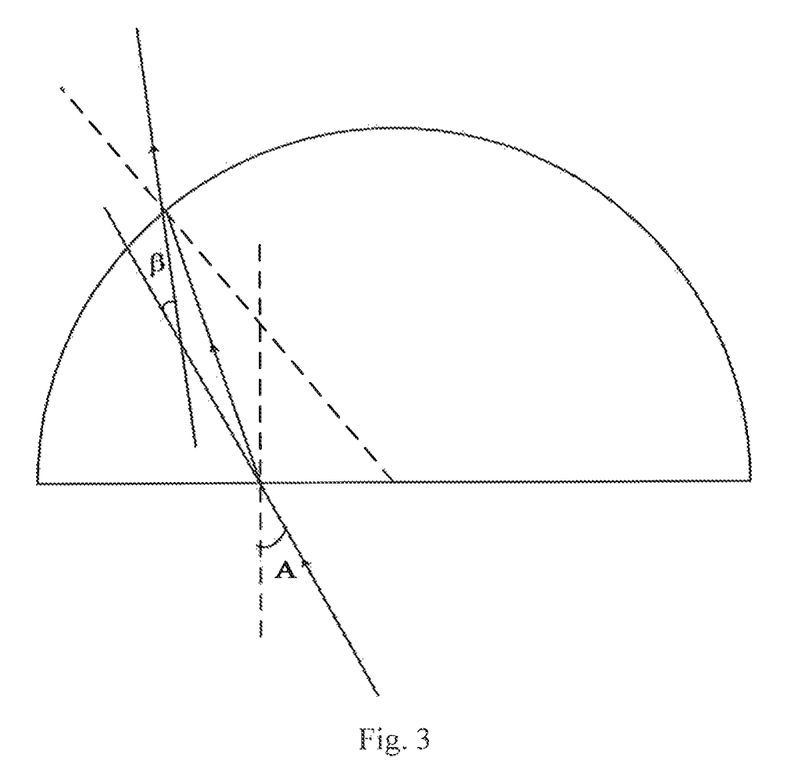
FIG. 3 is an optical path diagram in an embodiment of the present disclosure, in the case that each prism-unit structure has a cross-sectional shape of a semi-circle.

FIG. 3 is an optical path diagram in an embodiment of the present disclosure, in the case that each prism-unit structure 11 has a cross-sectional shape of a semi-circle. In the case that each of the prism-unit structures 11 has a cross-sectional shape of a semi-circle, for the incident angle of each bundle of the linear lights irradiating on a bottom surface of the corresponding prism-unit structure 11 and the deflection angle of the emergent lights with respect to the incident lights after being refracted by the prism-unit structure 11, the following relationship is satisfied:

$$\beta = 2A - 2\arcsin\left(\frac{\sin A}{n}\right) \quad (2)$$

where, $\beta$ is the deflection angle of the emergent lights with respect to the incident lights, A is the incident angle of the incident lights, and n is the refractive index of the prism.

That is, in the case that each of the prism-unit structures 11 in the prism component 1 has a cross-sectional shape of a semi-circle, it is only required to satisfy the above relationship (2), so that it is achieved that each bundle of the linear lights can form visible lights of seven colors after being refracted by the corresponding prism-unit structure 11. The incident angle of each bundle of the linear lights irradiating on the bottom surface of the prism-unit structure is depended on the position and orientation of the grating 3. For example, by adjusting the inclination angle of the grating 3, the incident angle of each bundle of the linear lights can be changed.

The divergent lights emitted from each of the lights sources 21 can be converted into one or two bundles of linear lights after passing through the grating 3 by following implementations.

Figure 4:
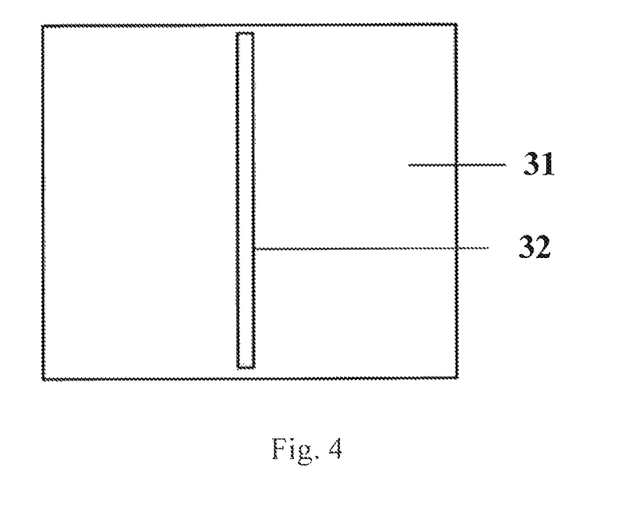
FIG. 4 is a schematic structural view of the grating shown in FIG. 1.

FIG. 4 is a schematic structural view of the grating shown in FIG. 1. The grating 3 may be a first plane-plate grating 31, and the first plane-plate grating 31 may have a first rectilinear grating slit 32 provided between each of the lights sources 21 and the corresponding prism-unit structure 11, so that divergent lights emitted from each of the lights sources 21 are converted into a bundle of linear lights after passing through the corresponding first grating slit 32, and incident into the corresponding prism-unit structure 11. That is, the gratings 3 and the lights sources 21 are equal in number, and each grating corresponds to one lights source 21, so that divergent lights emitted from the lights source 21 are converted into a bundle of linear lights, and is incident at a certain incident angle into the prism-unit structure 11. The longitudinal direction of the first grating slit 32 may be parallel to or perpendicular to the longitudinal direction of the prism-unit structure 11.

Figure 5:
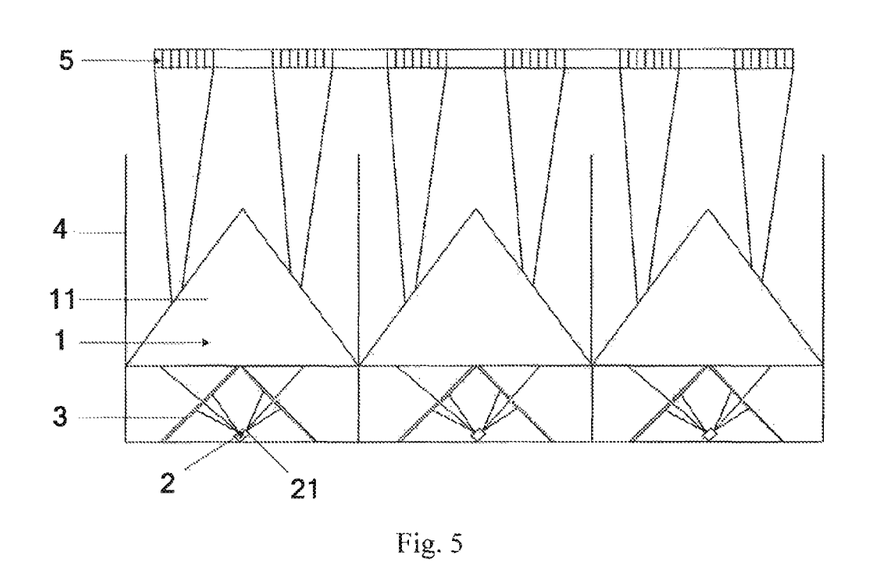
FIG. 5 is a schematic structural view of a direct-type backlight according to a second embodiment of the present disclosure.

In the first embodiment as described above, each of the lights sources 21 corresponds to one first plane-plate grating 31, so that divergent lights emitted from each of the lights sources 21 are converted into a bundle of linear lights after passing through one first plane-plate grating 31; however, the present disclosure is not limited thereto. It is also possible to use two first plane-plate gratings 31, so that divergent lights emitted from each of the lights sources 21 are converted into two bundles of linear lights. According to a second embodiment of the present disclosure, as shown in FIG. 5, two first plane-plate gratings 31 as shown in FIG. 4 are provided between each of the lights sources 21 and the corresponding prism-unit structure 11, and the lights source 21 is located between the two first plane-plate gratings 31, so that divergent lights emitted from each of the lights sources 21 are converted into two bundles of linear lights after passing through the corresponding two first grating slits 32 respectively, and incident into the corresponding prism-unit structure 11. The two bundles of linear lights irradiate on two different pixels in the liquid crystal display panel 5 respectively after being refracted by the corresponding prism-unit structure 11. Preferably, light emergent surfaces of each of the prism-unit structures 11 may be symmetric about the perpendicular bisector line of the bottom surface of that prism-unit structure, that is, each of the prism-unit structures 11 has a cross-sectional shape of an isosceles triangle, isosceles trapezoid or a semi-circle. Each of the lights sources 21 is correspondingly located between the two first plane-plate gratings 31 arranged symmetrically in an inverted V-shape, so that divergent lights emitted from each of the lights sources 21 are converted into two bundles of linear lights after passing through the first grating slits 32 of the corresponding two first plane-plate gratings 31 respectively, and incident at an identical incident angle into the corresponding prism-unit structure 11, respectively. For example, each of the prism-unit structures 11 has a cross-sectional shape of an isosceles triangle, and the two first plane-plate gratings 31 arranged symmetrically in an inverted V-shape are symmetric about the perpendicular bisector line of the bottom side of the isosceles triangle, and the lights source 21 is located between the two first plane-plate gratings 31, so that divergent lights emitted from the lights source 21 are converted into two bundles of linear lights after passing through the corresponding two first grating slits 32, and the two bundles of linear lights are incident at an identical incident angle into a same prism-unit structure 11, respectively. The two first plane-plate gratings 31 arranged symmetrically in an inverted V-shape may be an integrated structure, so as to facilitate mounting of the two first plane-plate gratings 31 in the direct-type backlight.

A baffle 4 may be provided between adjacent prism-unit structures 11 for alleviating the interference between the lights emitted from the two adjacent prism-unit structures 11. In the first embodiment shown in FIG. 1 and the second embodiment shown in FIG. 5, each baffle 4 is located between two adjacent triangular prism-unit structures 11, and is perpendicular to the bottom surfaces of the prism-unit structures 11.

As can be seen from the above solutions, in the direct-type backlight according to the present disclosure, firstly divergent lights emitted from each of the lights sources are converted into one or two bundles of linear lights by the grating, and then each bundle of the linear lights is split after being refracted by the prism to form visible lights of seven colors by using the light splitting function of the prism, and irradiates correspondingly on a pixel of the liquid crystal display panel. By control of the ON-OFF of each pixel, the full color range display of the liquid crystal display device can be achieved. Compared with the prior art, the embodiments of the present disclosure do not require a color filter layer, which reduces lights loss, thereby improving the transmittance of the liquid crystal display device.

Figure 6:
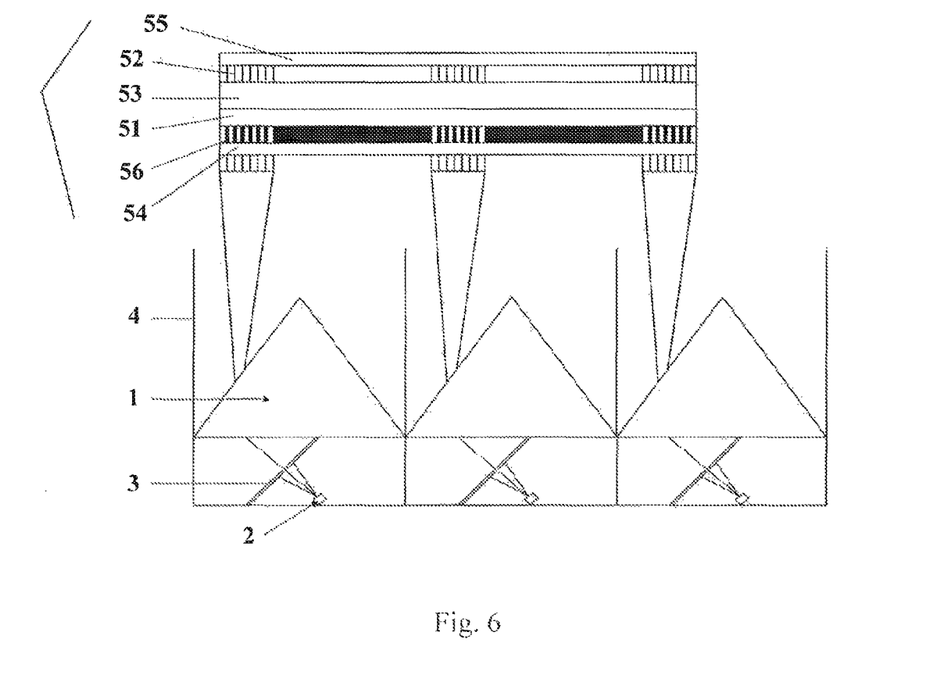
FIG. 6 is a schematic structural view of a liquid crystal display device according to an embodiment of the present disclosure.

As shown in FIG. 6, it is a schematic structural view of a liquid crystal display device according to an embodiment of the present disclosure. The liquid crystal display device according to this embodiment comprises a liquid crystal display panel 5, and a direct-type backlight in accordance with the embodiment of the present disclosure, which is provided at a side of the liquid crystal display panel. The liquid crystal display panel 5 comprises a plurality of pixels. Specifically, the liquid crystal display panel 5 may comprise an array substrate 52 and a counter substrate 51 which are cell-assembled, a liquid crystal layer 53 provided between the array substrate 52 and the counter substrate 51, a black matrix 56 having a plurality of openings and provided on the side of the counter substrate 51 facing away from the array substrate 52, a first polarizer 54 provided on the side of the black matrix 56 facing away from the array substrate 52, and a second polarizer 55 provided on the side of the array substrate 52 facing away from the counter substrate 51. The direct-type backlight is provided at the side of the first polarizer 54 facing away from the array substrate 52. Each of the openings of the black matrix corresponds to one pixel in the liquid crystal display panel 5.

The direct-type backlight in accordance with the embodiment of the present disclosure generates visible lights of seven colors; which irradiate on one pixel of the liquid crystal display panel 5 after passing through the corresponding opening in the black matrix 56. By control of the ON-OFF of each pixel, passage of the lights is controlled, so that the full color range display of the liquid crystal display device is achieved. The array substrate 52 is for example a thin-film-transistor (referred to as TFT) array substrate. By control of the ON-OFF of the thin-film transistors, the full color range display of the liquid crystal display device can be achieved.

Figure 7:
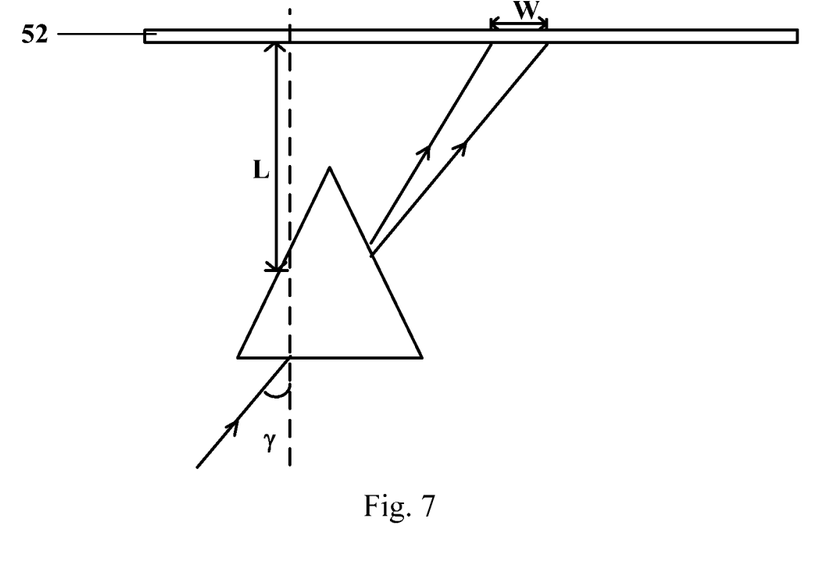
FIG. 7 is a schematic diagram showing the principle of full color range display of the liquid crystal display device according to the embodiment of the present disclosure.

FIG. 7 is a schematic diagram showing the principle of full color range display of the liquid crystal display device according to the embodiment of the present disclosure. In order to ensure that the visible lights of seven colors formed from each bundle of lights after refraction irradiates on the corresponding pixel of the liquid crystal display panel, the distance from the backlight to the array substrate has to satisfy following relationship:

$$L=W*(\cos \gamma)/(\tan \beta_1 - \tan \beta_2) \qquad (3)$$

where, L is the distance between the array substrate and the direct-type backlight, W is the width of each of the pixels on the array substrate, $\gamma$ is the angle between the incident lights and a normal line perpendicular to the array substrate, $\beta_1$ is the deflection angle of the emergent violet lights with a wavelength of 405 nm, $\beta_2$ is the deflection angle of the emergent red lights with a wavelength of 766 nm. The distance L between the array substrate and the direct-type backlight may be defined as the distance from the array substrate to a mid-plane between the top surface and the bottom surface of the prism component, as shown in FIG. 7.

Taking a quartz glass prism as an example, for visible lights (in the range of 405 nm~766 nm), its refractive index is in the range of 1.470~1.455, and assuming the width of each pixel in the array substrate 52 is 0.5 mm, the following results are obtained. If the angle $\alpha$ between the bottom surface and a lateral surface of the prism-unit structure 11 is 30°, the distance between the direct-type backlight and the array substrate is 53.6 mm by calculation. If the angle $\alpha$ between the bottom surface and a lateral surface of the prism-unit structure 11 is 45°, then the distance between the direct-type backlight and the array substrate is 31.5 mm by calculation. If the angle $\alpha$ between the bottom surface and a lateral surface of the prism-unit structure 11 is 60°, then the distance between the direct-type backlight and the array substrate is 15.2 mm by calculation.

Each opening of the black matrix may comprise seven sub-openings arranged at intervals for passage of the visible lights of corresponding color respectively, so that the individual visible lights of seven colors pass through the corresponding sub-openings respectively, thereby alleviating the interference among the visible lights of seven colors in each pixel.

In summary, in the direct-type backlight according to the present disclosure, firstly divergent lights emitted from each of the lights sources are converted into one or two bundles of linear lights by the grating, and then each bundle of the linear lights is split into visible lights of seven colors after being refracted by the prism by using the lights splitting function of the prism, and irradiate on the corresponding pixel of the liquid crystal display panel. And thus by control of the ON-OFF of each pixel, the full color range display of the liquid crystal display device can be achieved. Compared with the prior art, the embodiments of the present disclosure do not require a color filter layer, which reduces lights loss, thereby improving the transmittance of the liquid crystal display device.

The above implementations are merely used to explain the present disclosure, but not for limiting the present disclosure. A variety of variations and modifications can be made by the ordinary skilled in the related art, without departing from the spirit and scope of the present disclosure; therefore, all equivalent technical solutions should also belong to the present disclosure, and the scope of the present disclosure should be defined by the claims.

What is claimed is:

1. A direct-type backlight, comprising:
a prism component having a plurality of prism-unit structures;
a plurality of rows of lights sources located below the prism component, each row of the lights sources corresponding to one prism-unit structure, and each row of the lights sources comprising a plurality of lights sources, and
a plurality of gratings located between the prism component and the plurality of rows of lights sources,
wherein divergent lights emitted from each of the lights sources are converted into one or two bundles of linear lights after passing through the corresponding grating, and then each bundle of the linear lights is split into visible lights of seven colors after being refracted by the corresponding prism-unit structure, and
wherein each of the gratings is a plane-plate grating, the plane-plate grating has a rectilinear grating slit parallel to or perpendicular to a longitudinal direction of the prism component and the longitudinal direction is perpendicular to a cross-section of the prism component.

2. The direct-type backlight according to claim 1, wherein each of the prism unit structures has a cross-sectional shape of a triangle or a trapezoid, an incident angle of each bundle of the linear lights irradiating on a bottom surface of the corresponding prism-unit structure and a deflection angle of emergent lights with respect to incident lights after being refracted by the prism-unit structure satisfy following relationship:

$$\beta = A - \alpha + \arcsin(\sqrt{n^2 - \sin^2 A} \sin\alpha - \sin A \cos\alpha)$$

where β is the deflection angle of the emergent lights with respect to the incident lights, α is an angle between the bottom surface and a lateral surface of the prism-unit structure, A is the incident angle of the incident lights, and n is a refractive index of the prism-unit structure.

3. The direct-type backlight according to claim 2, further comprising a baffle provided between two adjacent prism-unit structures, for alleviating the interference of the emergent lights from the two adjacent prism-unit structures.

4. The direct-type backlight according to claim 1, wherein each of the prism-unit structures has a cross-sectional shape of a semi-circle, an incident angle of each bundle of the linear lights irradiating on a bottom surface of the corresponding prism-unit structure and a deflection angle of the emergent lights with respect to the incident lights after being refracted by the prism-unit structure satisfy following relationship:

$$\beta = 2A - 2\arcsin\left(\frac{\sin A}{n}\right)$$

where β is the deflection angle of the emergent lights with respect to the incident lights, A is the incident angle of the lights, and n is the refractive index of the prism.

5. The direct-type backlight according to claim 4, further comprising a baffle provided between two adjacent prism-unit structures, for alleviating the interference of the emergent lights from the two adjacent prism-unit structures.

6. The direct-type backlight according to claim 1, further comprising a baffle provided between two adjacent prism-unit structures, for alleviating the interference of the emergent lights from the two adjacent prism-unit structures.

7. The direct-type backlight according to claim 1, wherein one plane-plate grating is provided between each of the lights sources and the corresponding prism-unit structure, so that divergent lights emitted from each of the lights sources are converted into a bundle of linear lights after passing through the grating slit of the corresponding plane-plate grating, and are incident into the corresponding prism-unit structure.

8. The direct-type backlight according to claim 1, wherein two plane-plate gratings are between each of the lights sources and the corresponding prism-unit structure, and the lights source is located between the two plane-plate gratings, so that divergent lights emitted from each of the lights sources are converted into two bundles of linear lights respectively after passing through the grating slits of the corresponding two plane-plate gratings, and incident into the corresponding prism-unit structure.

9. The direct-type backlight according to claim 8, wherein light emergent surfaces of each of the prism-unit structures are symmetric about the perpendicular bisector line of the bottom surface of the prism-unit structure, and each of the lights sources is correspondingly located between the two plane-plate gratings and the two plane-plate gratings are arranged symmetrically in an inverted V-shape.

10. The direct-type backlight according to claim 9, wherein said two plane-plate gratings has an integrated structure, and the two plane-late gratings are arranged symmetrically in an inverted V-shape.

11. The direct-type backlight according to claim 8, wherein said two plane-plate gratings has an integrated structure, and the two plane-plate gratings are arranged symmetrically in an inverted V-shape.

12. The direct-type backlight according to claim 1, further comprising a baffle provided between two adjacent prism-unit structures, for alleviating the interference of the emergent lights from two adjacent prism-unit structures.

13. A liquid crystal display device, comprising:
a liquid crystal display panel comprising a plurality of pixels; and
a direct-type backlight provided at a side of the liquid crystal display panel, the direct-type backlight comprising:
a prism component having a plurality of prism-unit structures;
a plurality of rows of lights sources located below the prism component, each row of the lights sources corresponding to one prism-unit structure, and each row of the lights sources comprising a plurality of lights sources, and
a plurality of gratings located between the prism component and the plurality of rows of lights sources, wherein divergent lights emitted from each of the lights sources are converted into one or two bundles of linear lights after passing through the corresponding grating, and then each bundle of the linear lights is split into visible lights of seven colors after being refracted by the corresponding prism-unit structure, wherein said visible lights of seven colors formed by splitting of each bundle of the linear lights after being refracted by the corresponding prism-unit structure irradiate on the corresponding pixel of the liquid crystal display panel, and wherein each of the gratings is a plane-plate grating, the plane-plate grating has a rectilinear grating slit parallel to or perpendicular to a longitudinal direction of the prism component and the longitudinal direction is perpendicular to a cross-section of the prism component.

14. The liquid crystal display device according to claim 13, wherein the liquid crystal display panel comprises:
an array substrate and a counter substrate, which are cell-assembled,
a liquid crystal layer provided between the array substrate and the counter substrate,
a black matrix having a plurality of openings and provided on the side of the counter substrate facing away from the array substrate, with each opening of the black matrix corresponding to one pixel of the liquid crystal display panel,
a first polarizer provided on the side of the black matrix facing away from the array substrate, and
a second polarizer provided on the side of the array substrate facing away from the counter substrate,
wherein the direct-type backlight is provided at the side of the first polarizer facing away from the array substrate.

15. The liquid crystal display device according to claim 14, wherein each of the openings of the black matrix comprises seven sub-openings arranged at intervals for passage of the visible lights of corresponding individual color.

16. The liquid crystal display device according to claim 14, wherein a distance between the array substrate and the direct-type backlight satisfy following relationship:

$$L=W*(\cos \gamma)/(\tan \beta_1 - \tan \beta_2)$$

where L is the distance between the array substrate and the direct-type backlight, W is a width of each of the pixels on the array substrate, $\gamma$ is an angle between the incident lights and a normal line perpendicular to the array substrate, $\beta_1$ is a deflection angle of violet emergent lights with a wavelength of 405 nm, and $\beta_2$ is a deflection angle of red emergent lights with a wavelength of 766 nm.

17. The liquid crystal display device according to claim 13, wherein a distance between the array substrate and the direct-type backlight satisfy following relationship:

$$L=W*(\cos \gamma)/(\tan \beta_1 - \tan \beta_2)$$

where L is the distance between the array substrate and the direct-type backlight, W is a width of each of the pixels on the array substrate, $\gamma$ is an angle between the incident lights and a normal line perpendicular to the array substrate, $\beta_1$ is a deflection angle of violet emergent lights with a wavelength of 405 nm, and $\beta_2$ is a deflection angle of red emergent lights with a wavelength of 766 nm.

* * * * *